US012632306B2

(12) United States Patent (10) Patent No.: US 12,632,306 B2

Savchenko et al. (45) Date of Patent: May 19, 2026

---

(54) INFRASTRUCTURE PROVISIONING RUN PIPELINES

(71) Applicant: Scalr, Inc., San Francisco, CA (US)

(72) Inventors: Igor Savchenko, Walnut Creek, CA (US); Sebastian Stadil, Seattle, WA (US)

(73) Assignee: Scalr, Inc., San Francisco, CA (US)

( * ) Notice: Subject to any disclaimer, the term of this patent is extended or adjusted under 35 U.S.C. 154(b) by 387 days.

(21) Appl. No.: 18/139,475

(22) Filed: Apr. 26, 2023

(65) Prior Publication Data

US 2023/0342210 A1 Oct. 26, 2023

Related U.S. Application Data

(60) Provisional application No. 63/334,902, filed on Apr. 26, 2022.

(51) Int. Cl.
*G06F 3/00* (2006.01)
*G06F 9/50* (2006.01)
*G06F 9/54* (2006.01)

(52) U.S. Cl.
CPC .............. *G06F 9/5033* (2013.01); *G06F 9/54* (2013.01)

(58) Field of Classification Search
CPC ....................................................... G06F 9/48
See application file for complete search history.

(56) References Cited

U.S. PATENT DOCUMENTS

| | | | |
|---|---|---|---|
| 1,014,809 A | 1/1912 | Clark | |
| 6,412,009 B1 | 6/2002 | Erickson et al. | |
| 7,117,267 B2 | 10/2006 | Bavadekar | |
| 7,441,036 B2 | 10/2008 | Bomer et al. | |
| 8,010,497 B2 | 8/2011 | Verma et al. | |
| 8,429,630 B2 | 4/2013 | Nickolov et al. | |
| 8,699,499 B2 | 4/2014 | Mulligan et al. | |
| 8,782,637 B2 | 7/2014 | Khalid | |
| 9,003,411 B2 | 4/2015 | Wilson et al. | |
| 9,442,718 B1 | 9/2016 | Wang et al. | |
| 9,594,605 B2 | 3/2017 | Farrugia et al. | |
| 9,985,827 B2 | 5/2018 | Li | |
| 10,057,184 B1 | 8/2018 | Prahlad et al. | |
| 10,171,292 B1 | 1/2019 | Dolan et al. | |
| 10,176,005 B2 | 1/2019 | Silva et al. | |

(Continued)

OTHER PUBLICATIONS

João P. Serrano, Improvement of IT Infrastructure Management by Using Configuration Management and Maturity Models: A Systematic Literature Review and a critial Analysis. (Year: 2020).*

*Primary Examiner* — Lechi Truong

(74) *Attorney, Agent, or Firm* — Christensen, Fonder, Dardi & Busse PLLC

(57) ABSTRACT

Methods, systems, and computer program product for managing workspace runs in an information technology (IT) infrastructure is disclosed. In embodiments a method includes receiving a request to execute a run, the run at least including a planning step where proposed changes to a configuration of API-manageable resources are determined. In one or more embodiments, the method includes determining a first external application having a first associated action not included in the run. In one or more embodiments the method includes generating a run pipeline between the first external application by conditioning execution of the planning step by an IT infrastructure controller on the first associated action.

9 Claims, 7 Drawing Sheets

(56) References Cited

U.S. PATENT DOCUMENTS

| | | | |
|---|---|---|---|
| 10,318,285 | B1* | 6/2019 | Jodoin ................. G06F 11/3688 |
| 10,860,342 | B2 | 12/2020 | Kolesnikov et al. |
| 10,942,960 | B2 | 3/2021 | Oliner et al. |
| 10,970,125 | B2 | 4/2021 | Suresh et al. |
| 10,970,386 | B2 | 4/2021 | Cho et al. |
| 10,999,162 | B1 | 5/2021 | Welch et al. |
| 11,150,895 | B1 | 10/2021 | Wall |
| 11,223,526 | B1* | 1/2022 | Lang .................... H04L 41/0866 |
| 11,372,626 | B2 | 6/2022 | White, III et al. |
| 11,385,925 | B1 | 7/2022 | Mitra et al. |
| 11,522,812 | B1 | 12/2022 | Thoppai et al. |
| 11,558,313 | B2 | 1/2023 | Caceres et al. |
| 11,853,100 | B2 | 12/2023 | Sharma et al. |
| 11,947,574 | B2 | 4/2024 | Day, Jr. et al. |
| 12,045,201 | B1 | 7/2024 | Satish et al. |
| 2005/0108719 | A1 | 5/2005 | Need et al. |
| 2013/0074064 | A1 | 3/2013 | Das et al. |
| 2014/0047079 | A1 | 2/2014 | Breternitz et al. |
| 2015/0026673 | A1 | 1/2015 | Shetty |
| 2015/0040025 | A1 | 2/2015 | Deklich et al. |
| 2015/0378700 | A1 | 12/2015 | Rachamadugu et al. |
| 2017/0034075 | A1 | 2/2017 | Burk et al. |
| 2018/0241824 | A1 | 8/2018 | He |
| 2018/0284975 | A1* | 10/2018 | Carrier ................. G06F 16/9535 |
| 2019/0020540 | A1 | 1/2019 | Yen et al. |
| 2019/0141079 | A1* | 5/2019 | Vidas ....................... G06N 7/01 |
| 2019/0188185 | A1 | 6/2019 | Lichtenberg et al. |
| 2019/0324743 | A1 | 10/2019 | Sjadi |
| 2020/0106711 | A1 | 4/2020 | Sok et al. |
| 2020/0183707 | A1 | 6/2020 | Hashimoto et al. |
| 2020/0183739 | A1 | 6/2020 | Hashimoto et al. |
| 2020/0183754 | A1 | 6/2020 | Hashimoto et al. |
| 2020/0387357 | A1 | 12/2020 | Mathon et al. |
| 2021/0035116 | A1 | 2/2021 | Berrington et al. |
| 2021/0119874 | A1 | 4/2021 | Ryman et al. |
| 2021/0328864 | A1 | 10/2021 | Hashimoto et al. |
| 2021/0359920 | A1 | 11/2021 | Welch et al. |
| 2022/0014427 | A1 | 1/2022 | Lang et al. |
| 2022/0078228 | A1 | 3/2022 | Stitt et al. |
| 2022/0086055 | A1 | 3/2022 | Aftab et al. |
| 2022/0300340 | A1 | 9/2022 | Cardenas et al. |
| 2022/0353295 | A1 | 11/2022 | Yeh et al. |
| 2022/0353341 | A1 | 11/2022 | Östrand et al. |
| 2023/0133380 | A1 | 5/2023 | Kreger-Stickles et al. |
| 2023/0161945 | A1* | 5/2023 | Vadapandeshwara ....................... G06F 40/12 715/234 |
| 2023/0274230 | A1 | 8/2023 | Savchenko et al. |
| 2023/0315512 | A1 | 10/2023 | Savchenko et al. |
| 2023/0376308 | A1 | 11/2023 | Savchenko et al. |
| 2025/0097227 | A1 | 3/2025 | Grzonkowski et al. |

* cited by examiner

INFRASTRUCTURE PROVISIONING RUN PIPELINES

RELATED APPLICATIONS

The present application claims the benefit of U.S. Provisional Patent Application No. 63/334,902 filed Apr. 26, 2022, the disclosure of which is incorporated by reference herein in its entirety.

TECHNICAL FIELD

The present disclosure relates to information technology systems and, more specifically, to executing run tasks within a computing infrastructure.

BACKGROUND

Information technology (IT) infrastructure refers generally to the resources and services required for the establishment and operation of an IT environment. IT environments in turn, are then used by an enterprise or other organization to provide IT services to its employees and customers. Resources include hardware, software, and network resources, and can be provided remotely. For example, resources can be provided as Software-as-a-Service (SaaS), Platform-as-a-Service (PaaS), Infrastructure-as-a-Service (IaaS), web application, and the like.

Hardware resources are used to host software resources and include servers, computers, storage, routers, switches, and the like. Software resources include applications that are used by the enterprise or other organization for internal purposes or customer-facing purposes. For example, software resources can include enterprise resource planning (ERP) software applications, customer relationship management (CRM) software applications, productivity software applications, and the like. Network resources include the resources used to provide network connectivity, security, and the like. Remote access to software and hardware resources may be enabled and regulated by the network resources.

Within the IT environment, users can establish one or more workspaces to be available as a configuration of resources within the IT infrastructure. The one or more workspaces each include a configuration file that describes the rules for use of IT infrastructure, and values serving as inputs for the configuration file. The one or more workspaces also reference a state file describing the state of the IT infrastructure. Users can assign various projects to the one or more workspaces where there may be many people working on the same project, such as using a cloud-computing application, or where users work independently on different portions of the project Improvements to the field of IT infrastructure systems for the establishment and operation of IT environments would be welcome

SUMMARY

Embodiments of the present disclosure are directed to methods, systems, and computer program product for managing workspace runs in an information technology (IT) infrastructure system. Specifically, various embodiments provide benefits in the form of systems, methods and computer program product that generate and execute one or more "run pipelines" of IT processes or actions that are executed in a desired order by an infrastructure controller in combination with one or more other logical devices or software applications. As used herein, the term "run pipeline" refers to a system of connected logical devices, software applications, and the like, each having one or more process steps that are combined with the steps of executing a run (e.g. plan and/or apply) to define a larger run process. As such, various embodiments can connect otherwise unconnected system elements and process steps in a run pipeline. In such embodiments, the system can add new or additional conditions to the steps of executing a run and add conditions from otherwise unconnected system elements.

For example, in various embodiments progression through a run pipeline can be made conditional upon on one another such that progression from one step of a run to the next is conditional upon a previous step being completed in a logical device, software, or other system element that would ordinarily not be involved in executing a run. As an example of the type of actions contemplated for including in a run pipeline, in one or more embodiments, these process steps could include, preparing a Linux environment, pre-installing software, reviewing and/or approving steps, code analysis (e.g. Chekov code scan), adding tags (e.g. using Yor) or other information to a plan file. Further, in certain embodiments, the process steps could include compliance steps, such as compliance with auditing requirements that require generating and/or sending an auditing report after applying changes. As such, in various embodiments assist users in customizing or modifying the standard run process to comply with governmental or regulatory requirements, compliance standards, such as SOC 2 compliance, or the like.

In one or more embodiments a method of managing workspace runs includes one or more workspaces configured for maintaining configurations of API-manageable resources. One or more embodiments includes determining a run including one or more of a planning step where proposed changes to a configuration of API-manageable resources are determined and an apply step where the proposed changes are put into effect. One or more embodiments include determining a first external application having a first associated action not included in the run and generating a run pipeline between the first external application by conditioning execution of the planning step by an IT infrastructure controller on the first associated action. In various embodiments, additional external applications can be determined each including an associated action and further included in the run pipeline.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
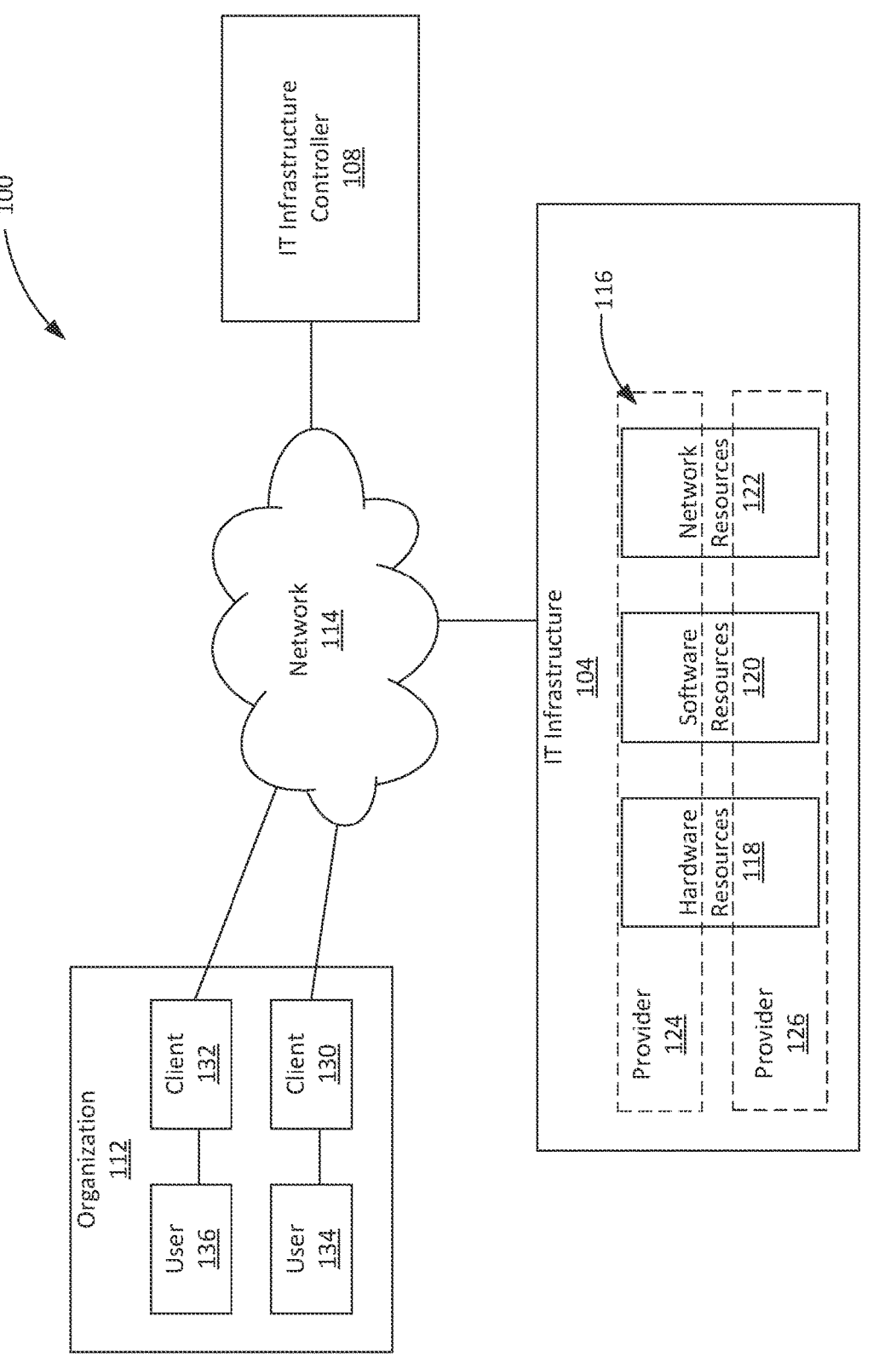
FIG. 1 depicts a system diagram of an information technology (IT) system, according to one or more embodiments of the disclosure.

While the embodiments of the disclosure are amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

Referring to FIG. 1, an information technology (IT) system 100 is depicted. In various embodiments, the system 100 includes an IT infrastructure 104, an IT infrastructure controller 108, and an organization 112. In one or more embodiments, the IT infrastructure 104, IT infrastructure controller 108, and the organization 112 are communicatively coupled via a network 114 which includes any wired or wireless network including, for example, a local area network (LAN), a wide area network (WAN), a public land mobile network (PLMN), the Internet, and the like.

In one or more embodiments the IT infrastructure 104 refers generally to a collection of one or more resources 116. Resources 116 can include hardware, software, and/or network components, and can be provided remotely. For example, resources 116 can include server hardware, virtual machines or instances, software applications, and the like. In various embodiments, resources 116 are defined or organized into one or more "blocks" that are managed by the system 100 for provisioning or de-provisioning components of the infrastructure 104. For example, depicted in FIG. 1, the infrastructure 104 is organized into a plurality of resource blocks that include a hardware resource 118, a software resource 120, and a network resource 122.

In one or more embodiments, the resources 116 are sourced from or otherwise provided by one or more providers 124, 126. In such embodiments, providers 124, 126 are entities, such as an individual, group, company, organization, or the like, that possess control over access to the resources 116. For example, the providers 124, 126 could be third party providers that provide access to resources as an infrastructure-as-a-service (IaaS), a platform-as-a-service (PaaS), a software-as-a-service (SaaS), or the like. In certain embodiments, the provider(s) 124, 126 can include the organization 112, such as where the organization owns or otherwise controls access to the resources themselves.

In one or more embodiments the blocks can include various information such as arguments, parameters, variables, tags, strings and the like which can be used to configure the resource. For example, the block could include strings indicating the resource type, the resource name, and the provider 124, 126. Further, while the resource blocks depicted in FIG. 1 as being defined by the type of resource (e.g., hardware, software, network), in certain embodiments the blocks could be organized according to a different manner. For example, the block could be organized based on the provider and/or could include including multiple types of resources in a single block.

In one or more embodiments, the IT infrastructure controller 108 is a logical device configured for programmatic control of access to resources 116 via a resource management API or other kind of software. In such embodiments, the controller 108 can create, check, modify, or delete the access to resources 116 for the organization 112 or other entity in the system 100.

For example, in various embodiments, the controller 108 is configured to receive infrastructure as code (IaC) instructions that describes a "configuration" of infrastructure. In one or more embodiments, based on the IaC instructions the controller 108 generates a plan that describes what the controller 108 will do to reach the desired state of infrastructure indicated by the configuration. In one or more embodiments the controller 108 can then execute or "apply" the plan to build the described infrastructure. Although in certain embodiments, the execution or application of the generated plan is optional and the controller 108 may simply generate the plan without an apply.

In various embodiments, the IaC instructions can be included within a configuration file. In such embodiments, the configuration file can represent a potential configuration of infrastructure that can be put into effect by the controller 108. For example, in one or more embodiments the configuration file includes resource definitions, environment variables, input variables, and/or other information described using an IaC language. A configuration file can be obtained by a user of a client computer and provided to the controller 108 to provision or de-provision infrastructure resources to match the state of infrastructure described by IaC instructions in the file. In various embodiments, configuration files describe the components needed to run an application, process, or the like. For example, in one or more embodiments the configuration file can be used by the user to provision resources in order to support the deployment, testing, and/or maintenance of a software application, and/or to ensure that the performance of the hosted software satisfies a threshold performance metric, such as a service level objective. In various embodiments, the configuration file can be obtained by a user from a database or registry of existing configuration files or can created by the user or by the organization 112.

In one or more embodiments, the organization 112 is a unit for and grouping clients, users, and the like, together and for controlling the group's access to resources 116. In various embodiments, the organization 112 can represent an enterprise or a sub-group within the enterprise, such as a business unit within the company. As shown in FIG. 1, the organization 112 can include one or more clients 130, 132, along with one or more associated users 134, 136 that interact with the system 100. Further, it should be appreciated that while FIG. 1 depicts a single organization 112, additional organizations, clients, and users may be included in the system 100.

Figure 2A:
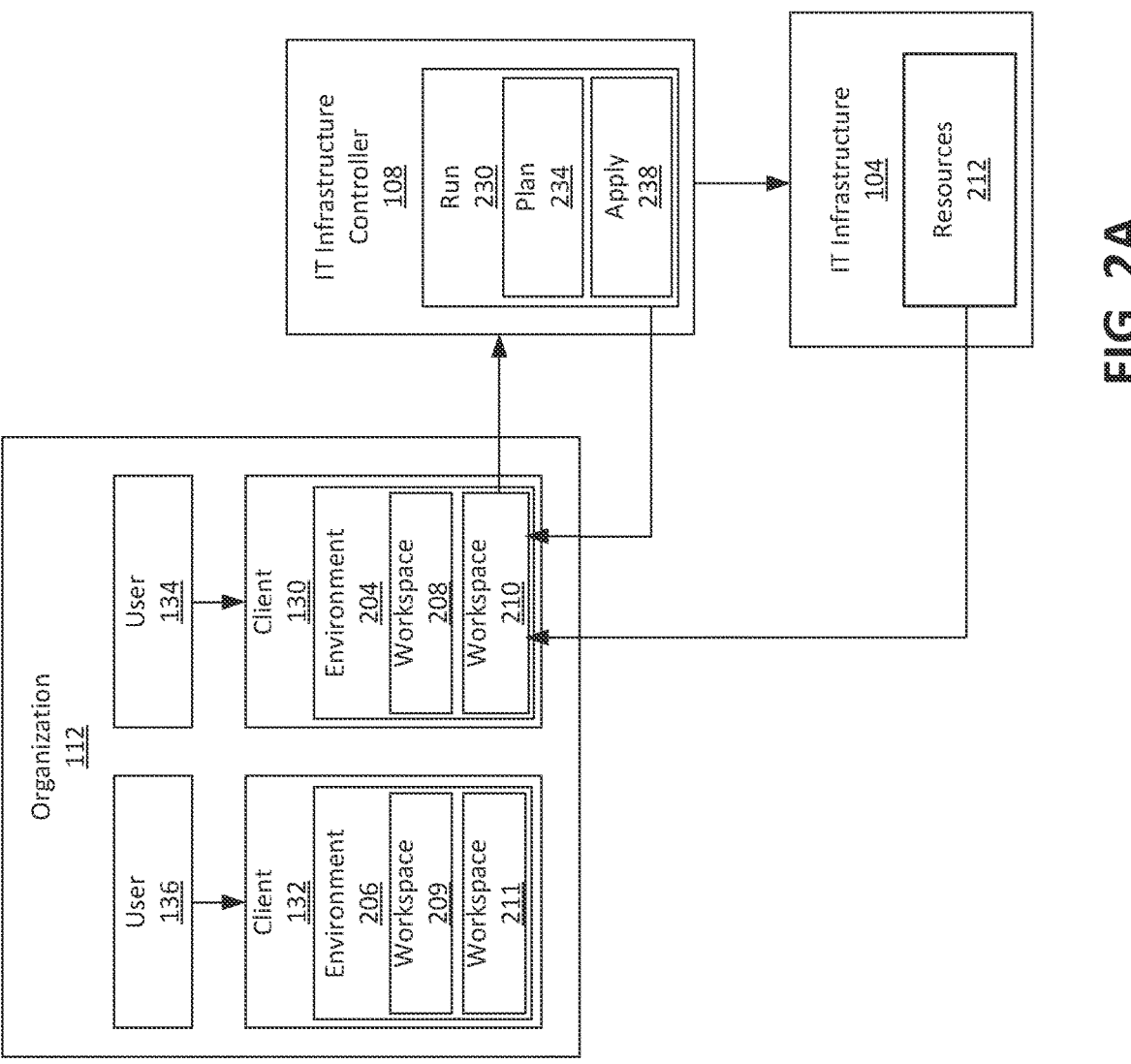
FIGS. 2A-B depict block diagrams of an IT system including IT environments and one or more workspaces, according to one or more embodiments of the disclosure.
Figure 2B:
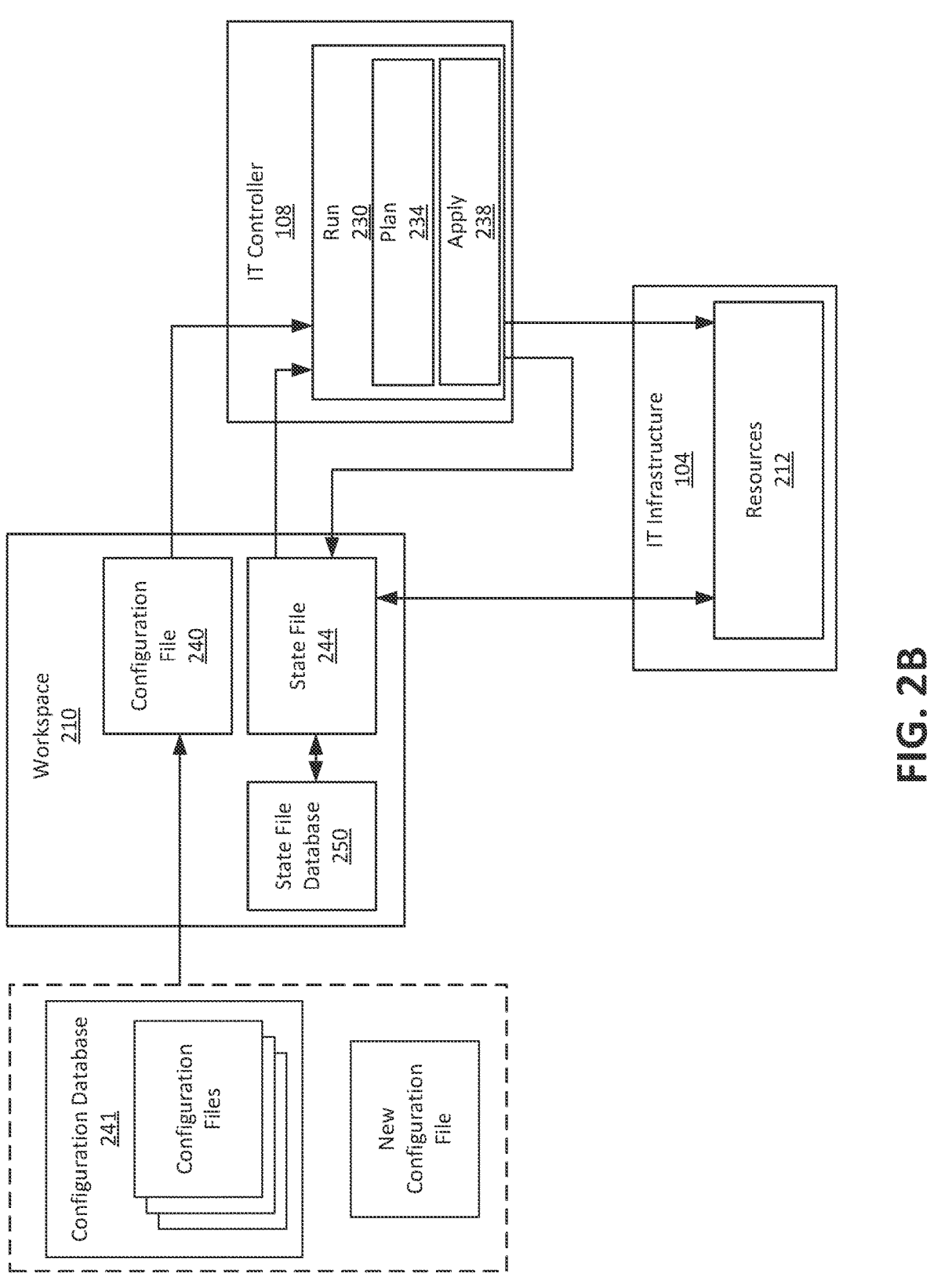

Referring to FIGS. 2A-2B, a block diagram of the organization 112 and IT environments 204, 206 is depicted and a block diagram of a workspace 210 is depicted, according to one or more embodiments. In various embodiments, the environment 200 includes an organization 112 grouping together one or more clients 130, 132 each associated with one or more users 134, 136. In various embodiments the clients 130, 132 each include an IT environment 204 which includes one or more workspaces 208, 209, 210, 211.

In one or more embodiments, a workspace is a unit for grouping a configuration of resources 212 that is planned to be provisioned or has been provisioned by the controller 108. In such embodiments, the planned or provisioned configuration of resources occurs within a workspace, and Each workspace contains everything necessary to manage a given collection of infrastructure. For instance, referring additionally to FIG. 2B, in various embodiments the workspace 210 contains configuration information including a configuration file 240 and one or more state files 244. For clarity and simplicity, the configuration information, including configuration files and state files associated with workspaces 208, 209, and 211 are omitted from FIGS. 2A-B. As described above, the configuration file 240 is a file including IaC instructions representing a potential configuration of infrastructure that can be put into effect by the controller 108. For example, in one or more embodiments the configuration file includes resource definitions, environment variables, input variables, and/or other information described using an IaC language. A configuration file can be obtained by a user of a client computer and provided to the controller 108 to provision or de-provision infrastructure resources to match the state of infrastructure described by IaC instructions in the file. In various embodiments the configuration file 240 can be obtained, inputted, or initialized from a configuration database 241 of existing configuration files or can created as a new file by the user or by the organization 112.

In various embodiments, the state files 244 serve as a "source of truth" for the workspace by including information that indicates a current state of infrastructure 104 including the resources 212 corresponding to each workspace. For example, in various embodiments the system stores the IDs and properties of the resources it manages for the workspace in the state file 244, so that it can update or destroy those resources 212 going forward. As such, the state file functions as a reference point for making changes to infrastructure 104 to match a configuration described in the configuration file 240.

In or more embodiments, this configuration information is maintained by the system and then is used whenever it executes an operation in the context of that workspace. For example, to further modify the infrastructure to provision or deprovision resources in that workspace. As such, in various embodiments the workspace will produce specific runs, including plans and/or applies, that are specific to each workspace. In one or more embodiments, each workspace retains backups or a database of configuration information. For example, in various embodiments the workspace includes a state file database 250 including some or all previous state files associated with the workspace. For example, the state file database 250 can be useful for tracking changes to the workspace over time or recovering from problems. In certain embodiments, the workspace includes a run history database that includes a record of all run activity, including one or more of summaries, logs, a reference to the changes that caused the run, and user comments.

In one or more embodiments the IT infrastructure controller 108 is configured to perform one or more operations to provision, modify, and/or de-provision resources 212 at the infrastructure 104 in order to apply the configuration file 240 associated with the workspace 210. In various embodiments, this process is referred to as a "Run". Performing a run to provision infrastructure is expected such as when new configurations are added to the workspace 210 or when existing configurations need to be modified. In various embodiments, the IT infrastructure controller 108 is configured to first plan the runs, thereby creating proposed changes to the infrastructure 104. In some embodiments, the plan of proposed changes is then executed by the controller 108 to actually modify the infrastructure 104.

Depicted in FIGS. 2A-2B, and described further below, a run 230 is depicted stored in the memory of the IT infrastructure controller 108. In various embodiments the run 230 may be in the process of being executed by the controller 108 or may be awaiting execution. For example, the run 230 may be awaiting execution along with one or more additional runs 230 stored in the memory of the controller 108. In one or more embodiments a run 230 can include a number of sub-elements or stages. For example, depicted in FIGS. 2A-2B the run 230 includes a plan 234 and an apply 238.

In one or more embodiments the plan 320 includes a plan file including declarative language describing proposed changes to the configuration 216. In various embodiments, the plan file is created by comparing the infrastructure state to a proposed configuration and proposed variables, and determining which changes are necessary to make the state match the proposed configuration. The plan file thus describes the changes deemed necessary using declarative language which can be applied by the IT infrastructure controller 108. In one or more embodiments, the apply 238 includes carrying out the changes declared by the plan 234 and applying the changed configuration to the infrastructure 104. In various embodiments, this includes provisioning and/or de-provisioning some or all resources accessible by the workspace 210. In some embodiments, the apply stage 328 can be automatically executed subsequent to the plan stage 320. However, in other embodiments, the apply stage 328 can wait for approval or feedback to perform the apply.

In certain embodiments the run 230 could include only the plan 234 and not include the apply 238. In some embodiments, the run 230 could include any number of additional steps. For example, in certain embodiments, the run 230 could include cost review steps, policy check steps, or other steps required in any order desired for execution by the controller 108.

Described further below, in various embodiments, the steps of the run 230 can be included in a "run pipeline" of IT processes or actions that are executed in a desired order by the controller 108 and/or other logical device. As used herein, the term "run pipeline" refers to a system of connected logical devices, software applications, and the like, each having one or more process steps that are combined with the steps of executing a run (e.g. plan and/or apply) to define a larger run process. As such, the run pipeline can connect otherwise unconnected system elements and process steps and can add new conditions to the steps of executing a run from otherwise unconnected system elements. For example, in various embodiments progression through a run pipeline can be made conditional upon on one another such that progression from one step of a run to the next is conditional upon a previous step being completed in a logical device, software, or other system element that would ordinarily not be involved in executing a run. As an example of the type of actions contemplated for including in a run pipeline, in one or more embodiments, these process steps could include, preparing a Linux environment, pre-installing software, reviewing and/or approving steps, code analysis (e.g. Chekov code scan), adding tags (e.g. using Yor) or other information to a plan file. Further, in certain embodiments, the process steps could include compliance steps, such as compliance with auditing requirements that require generating and/or sending an auditing report after applying changes. As such, in various embodiments assist users in customizing or modifying the standard run process to comply with governmental or regulatory requirements, compliance standards, such as SOC 2 compliance, or the like.

Figure 3:
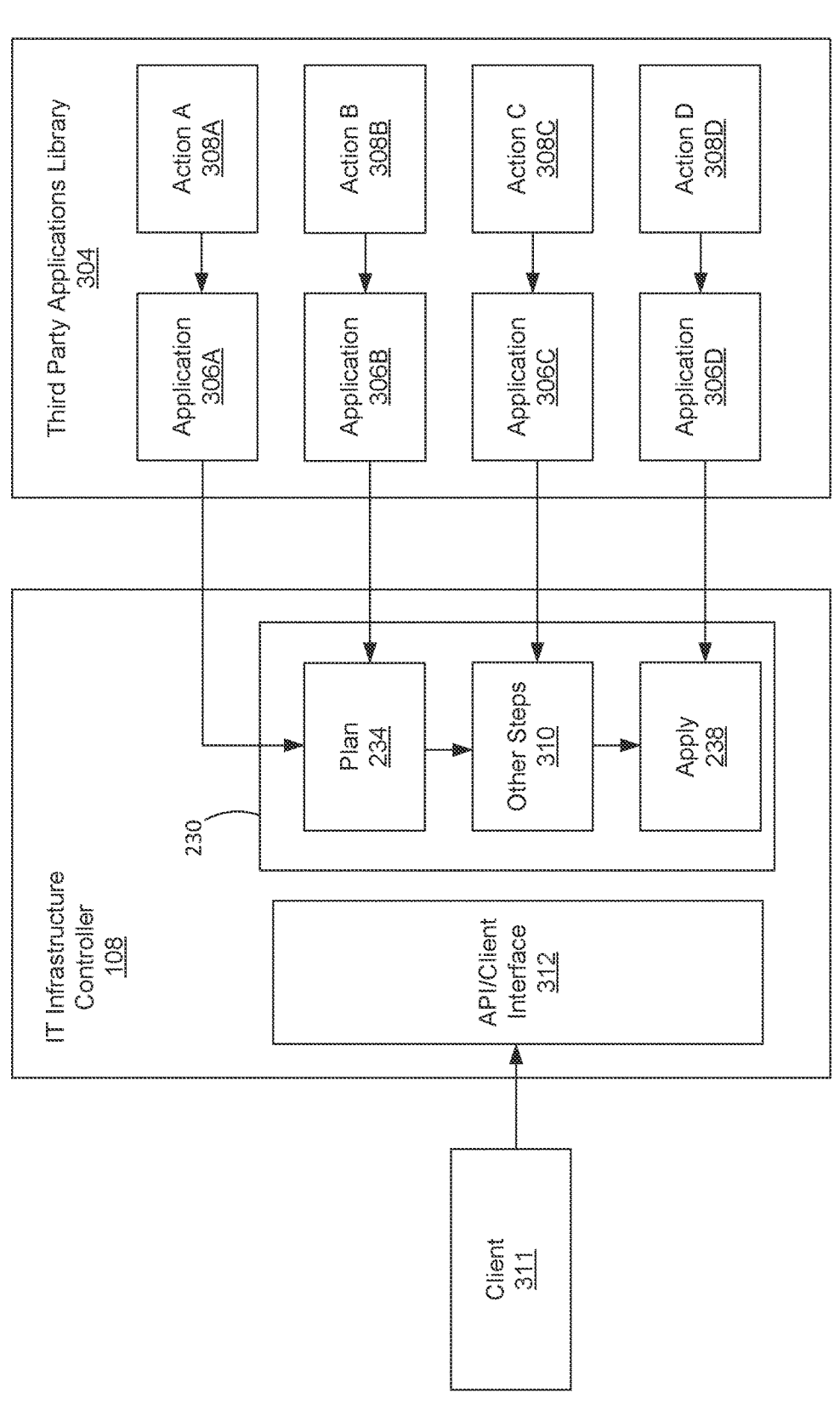
FIG. 3 depicts a block diagram of an IT infrastructure controller and a third-party applications library for forming run pipelines, according to one or more embodiments of the disclosure.

For example, referring to FIG. 3 a block diagram is depicted including an IT infrastructure controller 108 and a third-party application library 304 including one or more third party applications 306A-306D. As described above, controller 108 includes a run 230 in the memory of the controller 108 for execution of various steps/actions that make up the run 230. Depicted in FIG. 3, the run 230 includes a plurality of steps including a plan 234, apply 238, and one or more other steps 310 which can be included in the run 230, such as for example, cost review steps, policy check steps, or other steps required in any order desired for execution by the controller 108. In various embodiments, the run 304 is originated via a client computer 311 who can interface with the controller 108 via an API 312.

In various embodiments, the one or more third party applications 306A-306D each include an associated action 308A-308D which corresponds to a process step or action that is executed by that application. In various embodiments, these actions 308A-308D could be included in a run pipeline by linking one or more of the actions 308A-308D with one or more steps of the run 230. In such embodiments, the one or more third party applications 306A-306D and their associated action 308A-308D are linked to the run 230 to define a run pipeline including the application actions 308A-308D along with the steps of the run 230. Further, in such embodiments, the associated actions 308A can provide conditions on the execution of the run 230, for example by requiring that the associated action be successfully performed prior to moving to a subsequent action in the pipeline.

Figure 4A:
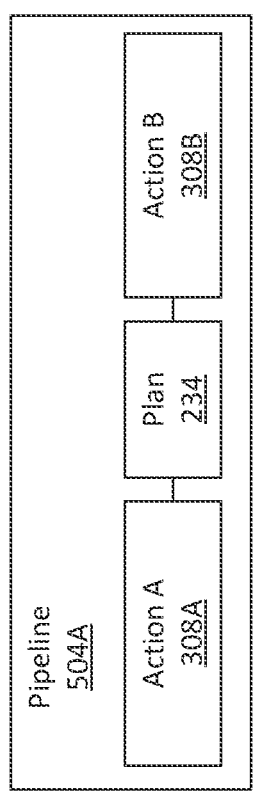
FIG. 4A-4C depicts run pipelines according to one or more embodiments of the disclosure.
Figure 4B:
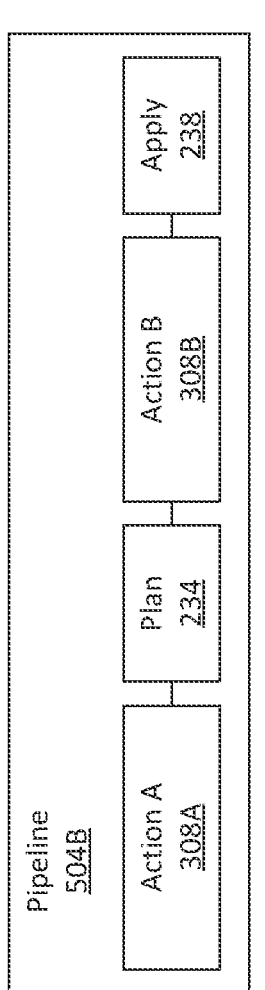
Figure 4C:
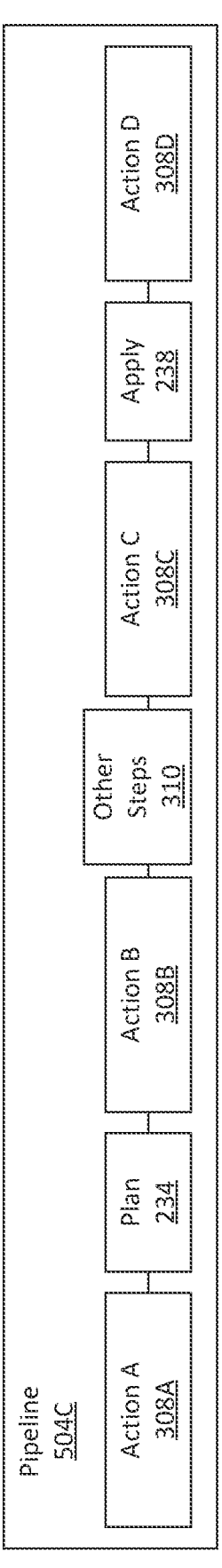

For example, referring to FIGS. 4A-4C, example run pipelines 504A-504D are depicted each including one or more steps of the run 230 and one or more linked actions 308A-308D from associated third party applications 306A-306D. Depicted in FIG. 4A, the pipeline 504A includes a first action 308A associated with a first application, a plan 234 step associated with a run 230, and a second section 308B associated with a second application. In various embodiments, pipeline 504A could be associated with a dry run or a run 230 that only includes a plan but not an apply. Depicted in FIG. 4B, the pipeline 504B includes a first action 308A associated with a first application, a plan 234 step associated with a run 230, and a second section 308B associated with a second application, and an apply 238 step associated with the run 230. Depicted in FIG. 4C, the pipeline 504B includes a first action 308A associated with a first application, a plan 234 step associated with a run 230, and a second section 308B associated with a second application, other run steps 310, a third action 308C associated with a third application, an apply 238 step associated with the run 230, and a fourth action 308D associated with a fourth application. While we refer herein to first, second, third, and fourth applications, in one or more embodiments these applications may be the same application or different application. Similarly, the first through fourth actions may be the same or different actions and regardless of whether their associated application is the same or different.

Figure 5:
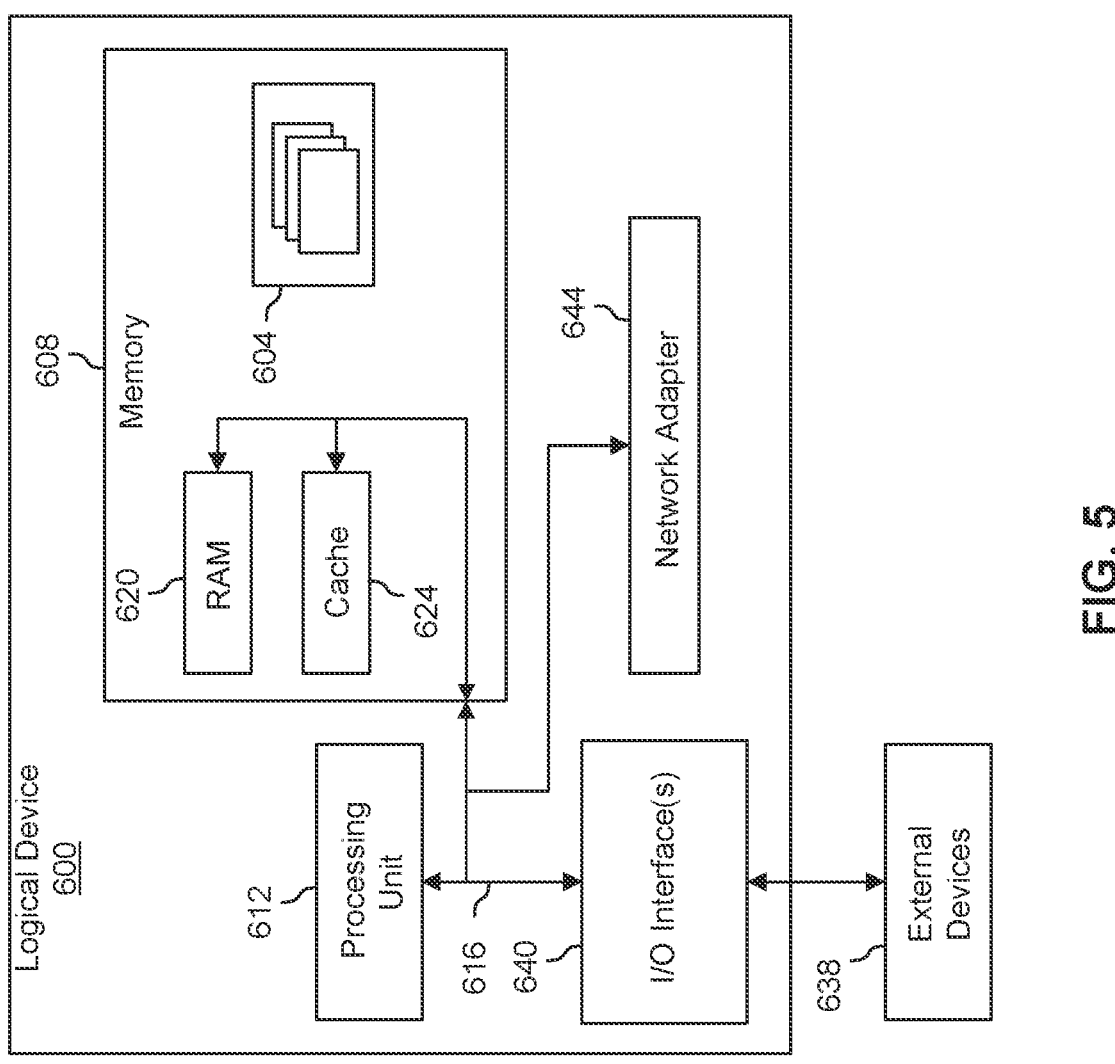
FIG. 5 depicts a logical device including a processor and a computer readable storage unit are depicted, according to one or more embodiments of the disclosure.

Referring to FIG. 5, a logical device 600 including a processor and a computer readable storage unit are depicted, according to one or more embodiments of the disclosure. In various embodiments, logical 600 is for use in IT management system for executing various embodiments of the disclosure as described above. For example, and as described herein, logical device 600 can be configured to execute and/or store various program instructions as a part of a computer program product. Logical device 600 may be operational with general purpose or special purpose computing system environments or configurations, such as the systems described according the embodiments herein.

Examples of computing systems, environments, and/or configurations that may be suitable for use with logical device 600 include, but are not limited to, personal computer systems, server computer systems, handheld or laptop devices, multiprocessor systems, mainframe computer systems, distributed computing environments, and the like.

Logical device 600 may be described in the general context of a computer system, including executable instructions, such as program modules 604, stored in system memory 608 being executed by a processor 612. Program modules 604 may include routines, programs, objects, instructions, logic, data structures, and so on, that perform particular tasks or implement particular abstract data types. Program modules 604 may be practiced in distributed computing environments where tasks are performed by remote processing devices that are linked through a network. In a distributed computing environment, program modules 604 may be located in both local and remote computer system storage media including memory storage devices. As such, in various embodiments logical device 600 can be configured to execute various program modules 604 or instructions for executing various embodiments of the disclosure. For example, in various embodiments logical device 600 can be configured to execute a run or a policy run to generate proposed changes to a configuration or to modify polices in a policy group associated with a workspace.

The components of the logical device 600 may include, but are not limited to, one or more processors 612, memory 608, and a bus 616 that couples various system components, such as, for example, the memory 608 to the processor 612. Bus 616 represents one or more of any of several types of bus structures, including, but not limited to, a memory bus and/or memory controller, a peripheral bus, and a local bus using a suitable of bus architecture.

In one or more embodiments, logical device 600 includes a variety of computer readable media. In one or more embodiments, computer readable media includes both volatile and non-volatile media, removable media, and non-removable media.

Memory 608 may include computer readable media in the form of volatile memory, such as random access memory (RAM) 620 and/or cache memory 624. Logical device 600 may further include other volatile/non-volatile computer storage media such as hard disk drive, flash memory, optical drives, or other suitable volatile/non-volatile computer storage media. As described herein, memory 608 may include at least one program product having a set (e.g., at least one) of program modules 604 or instructions that are configured to carry out the functions of embodiments of the disclosure.

Logical device 600 may also communicate with one or more external devices 638 such as other computing nodes, a display, keyboard, or other I/O devices, via an I/O interface(s) 640 for transmitting and receiving sensor data, instructions, or other information to and from the logical device 600. In one or more embodiments, I/O interface 640 includes a transceiver or network adaptor 644 for wireless communication. As such, in one or more embodiments, I/O interface 640 can communicate or form networks via wireless communication.

One or more embodiments may be a computer program product. The computer program product may include a computer readable storage medium (or media) including computer readable program instructions for causing a processor to enhance target intercept according to one or more embodiments described herein. The computer readable storage medium is a tangible device that can retain and store instructions for use by an instruction execution device. The computer readable storage medium may be, for example, an electronic storage device, a magnetic storage device, an optical storage device, or other suitable storage media.

A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Program instructions, as described herein, can be downloaded to respective computing/processing devices from a computer readable storage medium or to an external computer or external storage device via a network, for example, the Internet, a local area network, a wide area network and/or a wireless network. A network adapter card or network interface in each computing/processing device may receive computer readable program instructions from the network and forward the computer readable program instructions for storage in a computer readable storage medium within the respective computing/processing device.

Computer readable program instructions for carrying out one or more embodiments, as described herein, may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a single computer, or partly on the single computer and partly on a remote computer. In some embodiments, the computer readable program instructions may execute entirely on the remote computer. In the latter scenario, the remote computer may be connected to the single computer through any type of network, including a local area network (LAN) or a wide area network (WAN), or public network.

One or more embodiments are described herein with reference to flowchart illustrations and/or block diagrams of methods, systems, and computer program products according to one or more of the embodiments described herein. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the method steps discussed above, or flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The method steps, flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some embodiments, the functions noted in the block may occur out of the order noted in the figures. For example, two blocks shown in succession may in fact, be executed substantially concurrently, or the blocks may sometimes be executed in the reverse order, depending upon the functionality involved.

In one or more embodiments, the program instructions of the computer program product are configured as an "App" or application executable on a laptop or handheld computer utilizing a general-purpose operating system. As such, in various embodiments can be implemented on a handheld device such as a tablet, smart phone, or other device.

In various embodiments, the code/algorithms for implementing one or more embodiments are elements of a computer program product, as described above, as program instructions embodied in a computer readable storage medium. As such, such code/algorithms can be referred to a program instruction means for implementing various embodiments described herein.

In addition, to the above disclosure, U.S. Pat. No. 11,223, 526 is hereby incorporated by reference.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method of managing workspace runs in an information technology (IT) infrastructure system including one or more workspaces configured for maintaining configurations of API-manageable resources, the method comprising:

receiving a request to execute a run, the run at least including a planning step where proposed changes to a configuration of API-manageable resources are determined, one or more other steps, including, one or more of cost review steps and policy check steps, and an apply step where the proposed changes to the configuration of API-manageable resources are carried out by the IT infrastructure controller;

determining a first external application having a first associated action not included in the run;

determining a second external application having a second associated action not included in the run;

determining a third external application having a third associated action not included in the run;

generating a run pipeline that includes execution of the planning step by the IT infrastructure controller conditioned on the first action associated with the first external application, execution of the one or more other steps by the IT infrastructure controller conditioned on the second action associated with the second external application, and execution of the apply step by the IT infrastructure controller conditioned on the third action associated with the third external application, such that the run pipeline links the first, second and third external applications with the run;

wherein the first action associated with the first external application is executed by a logical device, software or system element other than the IT infrastructure controller.

2. The method of claim 1, wherein the first, second and third external applications are the same application.

3. The method of claim 2, wherein the first, second, and third associated actions are different actions.

4. The method of claim 1, wherein the first, second, and third associated actions process steps could include one or more of preparing a Linux environment, pre-installing software, reviewing and/or approving steps, code analysis, adding tags, and generating and/or sending an auditing reports.

5. An information technology (IT) system comprising:

an IT infrastructure comprising cloud resources including one or more of hardware resources, software resources, and network resources;

a library of one or more external applications; and an IT infrastructure controller networked with the IT infrastructure, the controller comprising:

a processor; and computer readable non-transitory memory including computer executable instructions, the instructions executable by the processor to cause the processor to:

receive a request to execute a run, the run at least including a planning step where proposed changes to a configuration of cloud resources are determined, one or more other steps, including, one or more of cost review steps and policy check steps, and an apply step where the proposed changes to the configuration of API-manageable resources are carried out by the IT infrastructure controller;

determine a first external application from the library of one or more external applications, the first external application having a first associated action not included in the run;

determine a second external application having a second associated action not included in the run;

determine a third external application having a third associated action not included in the run;

generate a run pipeline that includes execution of the planning step by the IT infrastructure controller conditioned on the first action associated with the first external application, execution of the one or more other steps by the IT infrastructure controller conditioned on the second action associated with the second external application, and execution of the apply step by the IT infrastructure controller conditioned on the third action associated with the third external application, such that the run pipeline links the first, second and third external applications with the run, wherein the first action associated with the first external application is executed by a logical device, software or system element other than the IT infrastructure controller.

6. The system of claim 5, wherein the first, second and third external applications are the same application.

7. The system of claim 6, wherein the first, second, and third associated actions are different actions.

8. The system of claim 5, wherein the first, second, and third associated actions process steps could include one or more of preparing a Linux environment, pre-installing software, reviewing and/or approving steps, code analysis, adding tags, and generating and/or sending an auditing reports.

9. The system of claim 5, wherein the first external application is not executed by the IT infrastructure controller.

* * * * *